United States Patent
McCall et al.

(10) Patent No.: US 6,912,662 B1
(45) Date of Patent: Jun. 28, 2005

(54) COOLING-OFF PERIOD FOR DESTRUCTIVE SOFTWARE

(75) Inventors: Colin David McCall, Glasgow (GB); Richard Ian Knox, Bridge-of-Weir (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/350,405

(22) Filed: Jul. 8, 1999

(30) Foreign Application Priority Data

Oct. 24, 1998 (GB) .............................................. 9823240

(51) Int. Cl.⁷ .......................... G06F 11/30; G06F 12/14; H04L 9/00; H04L 9/32
(52) U.S. Cl. ........................ 713/200; 713/201; 709/310
(58) Field of Search ................................ 713/200, 201; 709/310; 345/705, 707–715, 814

(56) References Cited

U.S. PATENT DOCUMENTS

| | | | | |
|---|---|---|---|---|
| 5,956,481 A | * | 9/1999 | Walsh et al. | 713/200 |
| 6,049,875 A | * | 4/2000 | Suzuki et al. | 713/200 |
| 6,178,503 B1 | * | 1/2001 | Madden et al. | 713/2 |

* cited by examiner

Primary Examiner—Gregory Morse
Assistant Examiner—Christopher J. Brown
(74) Attorney, Agent, or Firm—George E. Grosser; Carlos Munoz-Bustamante; Dillon & Yudell LLP

(57) ABSTRACT

In a computer system, a user action can cause a computer program to perform actions which may destroy data stored on the computer or on an associated computer. User actions are managed to reduce this possibility by testing the consequences of the user action and if the consequences of the user action are benign, the user action is completed. If the consequences are not benign, a delay period prior to completing the user action is initiated. During this delay period, the user is able to cancel the user action.

30 Claims, 2 Drawing Sheets

COOLING-OFF PERIOD FOR DESTRUCTIVE SOFTWARE

BACKGROUND OF DESCRIPTION

1. Technical Field

The present invention relates to a computer system in which a user action can cause a computer program to perform actions which may destroy data stored on the computer or on an associated computer.

2. Description of Related Art

Many software systems include user actions that are intended to destroy unwanted information, either to make media space available for other uses, or for security reasons, e.g., to prevent the information falling into the wrong hands. However, there is a risk of a user inadvertently destroying the wrong data.

Computer systems commonly use a number of different techniques to reduce this risk. One technique is to require a user to replay to a dialog box asking "Are you sure?" to confirm the action or to require the addition of an extra parameter to a typed system command. This approach suffers, however, from the problem that users have become accustomed to it and confirm the action without thinking about whether they really do want to perform the action they have requested. The warning is not only ineffective, it has become irritating in the normal case.

Another technique is to make the action reversible by not really destroying the information, e.g., just hiding it in some way like moving a file reference to a "recycle bin" folder. This approach, however, is not useful for security, as the information is still accessible. It also requires a second action to make the space available—like "emptying the recycle bin," which is itself an irritation to the user.

A further technique is to keep a backup copy of the data so it can be recovered. This requires that sufficient storage space is available to allow a backup copy to be kept. It also requires an additional action from the user to delete the backup. If the backup is deleted without further user intervention once the action is 'successful,' it does not protect the data against unintended user actions.

Some software systems allow actions to be scheduled for some time in the future, but do not allow a delay to be added by default.

So it would be desirable to provide a technique whereby recovery is allowed when a user asks a computer to perform an action which results in loss of information, but which still allows for the destruction of information for the purposes of security and for freeing up disk space.

SUMMARY OF THE INVENTION

Accordingly, the invention provides a method, for use in a computer system, of managing user actions, the method comprising the steps of: responsive to a user action, testing the consequences of the user action; responsive to the consequences of the user action being benign, completing the user action; responsive to the consequences of the user action not being benign, initiating a delay period prior to completing the user action; and responsive to an indication from the user during the delay period to cancel the user action, cancelling the user action.

In many cases when the user makes a mistake he is immediately aware of it; just after it becomes irrevocable. The implementation of a 'cooling-off period' means that after a user action is issued, the user has a fixed time during which the action is reversible. This has the advantage that the original command really does have the desired effect without the irritation of additional redundant actions.

In a first embodiment, the delay period is set to a pre-determined value by the user. Typically, this value may be five minutes. This allows the user to become aware of the mistake he has just made to reverse the user action which was taken.

In a second embodiment, the delay period is set to a value determined by the consequences of the user action. This allows a longer delay period to be set for actions that are more destructive and that may take longer to recover from, if recovery is possible. On the other hand, this allows a shorter delay to be set for actions from which recovery will be relative quick. A short delay reduces the risk to security where the information is being deleted for security purposes and also frees up media space as quickly as possible.

In a third embodiment, the delay period is set to a value determined by the function of the user's computer system. This has the advantage that in a system where only information of relatively low value in stored, the delay period may be set to a shorter time, but in a system where information of higher value is stored, a longer delay period may be set.

In a preferred embodiment, the method further includes the step of presenting the user with an indication that the user action is in a delayed state.

The invention also provides a computer system that includes: means for receiving a user action; means for testing the consequences of the user action; means, responsive to the means for tesing the consequences of the user action as being benign, for completing the user action; means, responsive to the means for testing the consequences of the user action not being benign, for initiating a delay period prior to completing the user action; means for receiving a request from the user to cancel the user action; and means, responsive to the means for receiving a request from the user to cancel the user action, for cancelling the user action.

BRIEF DESCRIPTION OF THE DRAWINGS

Embodiments of the invention will now be described, by way of example, with reference to the accompanying drawings, in which.

DETAILED DESCRIPTION OF ILLUSTRATIVE EMBODIMENT

Figure 1:
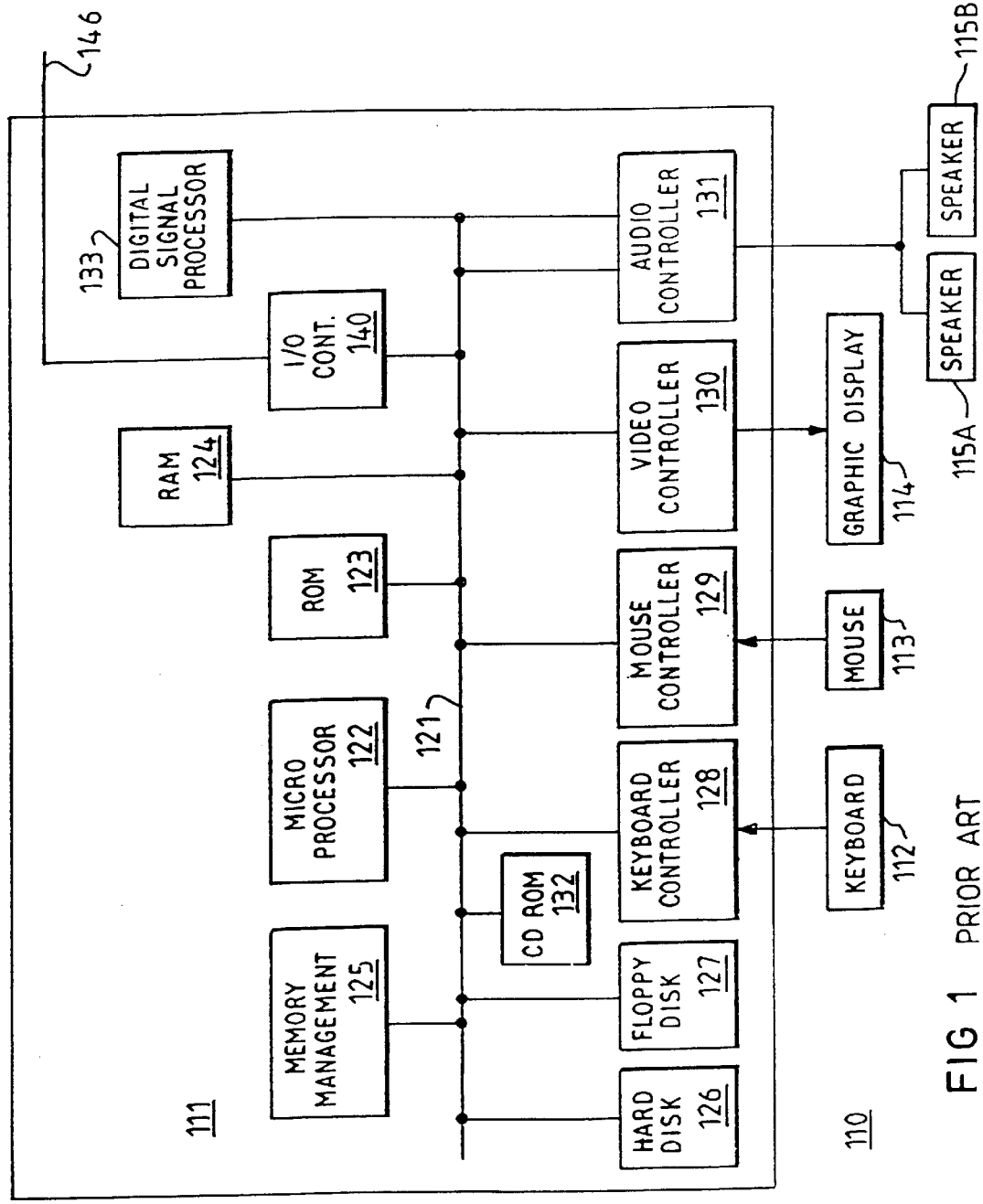
FIG. 1 is a block diagram of a prior art computer system in which the present invention may be used.

In FIG. 1, a prior art computer 110 comprising a system unit 111, a keyboard 112, a mouse 113 and a display 114 are depicted in block diagram form. System unit 111 includes a system bus or plurality of system buses 121 to which various components are coupled and by which communication between the various components is accomplished. A microprocessor 122 is connected to system bus 121 and is supported by read only memory (ROM) 123 and random access memory (RAM) 124 that are also connected to system bus 121. In many typical computers, the microprocessors employed include the 386, 486 or Pentium microprocessors (Intel and Pentium are trademarks of Intel Corp.). However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or other microprocessors from Hewlett Packard, Sun, Motorola and others may be used in computer 110.

ROM 123 contains among other code, the Basic Input-Output system (BIOS) that controls basic hardware operations, such as the interaction between the CPU, the disk drives and the keyboard. RAM 124 is the main memory into which the operating system and application programs are loaded. A memory management chip 125 is also connected to system bus 121 and controls direct memory access operations including, passing data between RAM 124, hard disk drive 126 and floppy disk drive 127. A CD ROM 132 is also coupled to system 121 and is used to store a large amount of data, e.g. a multimedia program or presentation. CD ROM 132 may be an external CD ROM connected through an adapter card or it may be an internal CD ROM having direct connection to a motherboard.

Also shown connected to system bus 121 are various I/O controllers: keyboard controller 128, mouse controller 129, video controller 130 and audio controller 131. As might be expected, keyboard controller 128 provides the hardware interface for keyboard 112, mouse controller 129 provides the hardware interface for mouse 113, video controller 130 is the hardware interface for display 114, and audio controller 131 is the hardware interface for speakers 115a and 115b. An I/O controller 140, such as a Token Ring adapter card, enables communication over a network 146 to other similarly configured data processor systems. These I/O controllers may be located on the motherboard or they may be located on adapter cards that plug into the motherboard, either directly or into a riser card. The adapter cards may communicate with the motherboard using a PCI interface, an ISA or EISA interface or other interfaces.

In an embodiment of the invention, a software system running on a server system provides a selection of software install and maintenance services for attached clients. Some of these are considered 'destructive' in that they cause an unrecoverable loss of information of the client system. An example of such a service is a secure low-level erase of the hard file to remove all information before disposing of the client system. A user of the server system has the option of setting the cooling-off period as a global parameter applicable to all destructive operations. A typical value would be 5 minutes.

Figure 2:
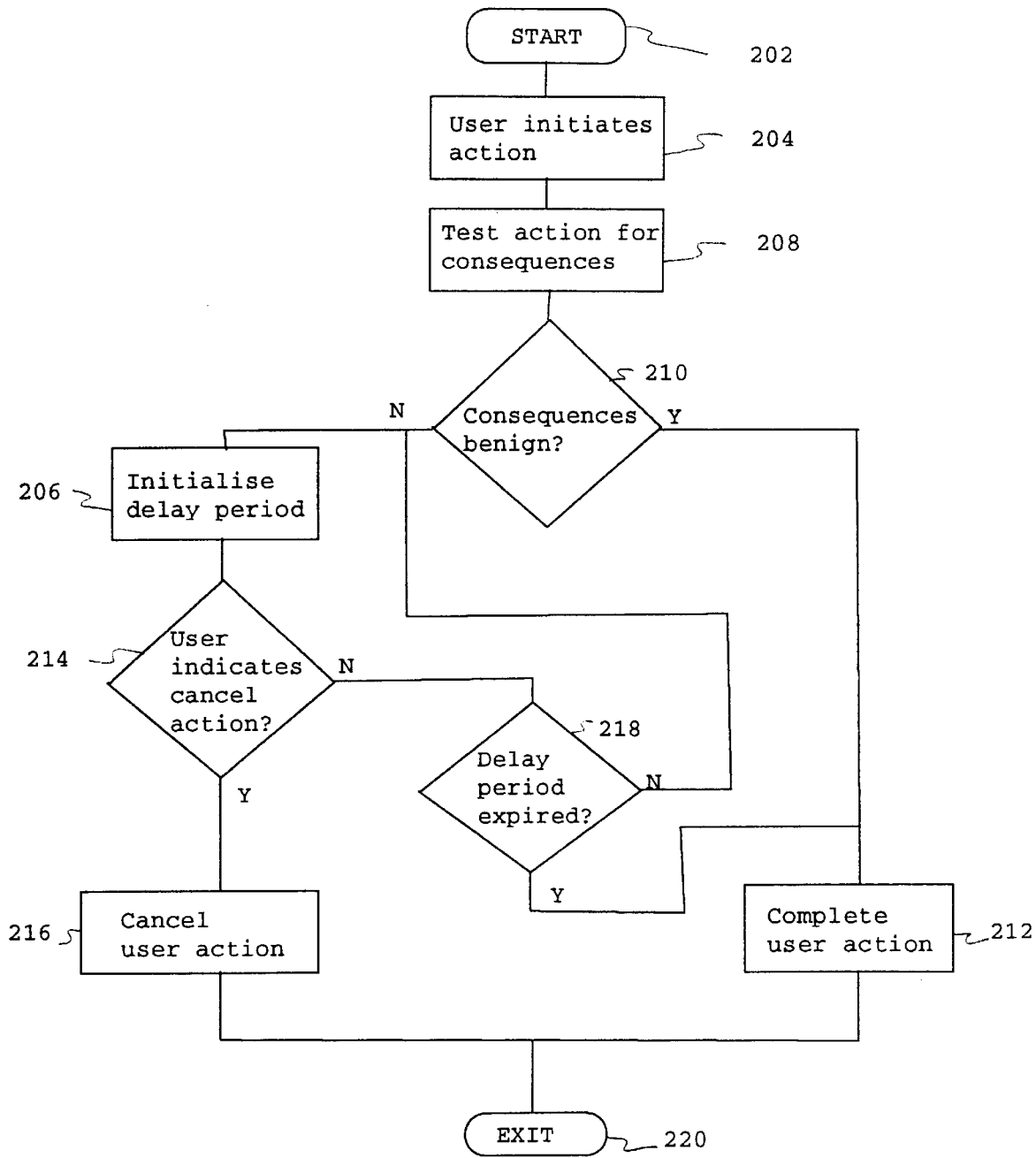
FIG. 2 is a flow chart of preferred embodiment of the invention.

The user selects a service by selecting the client system from a list of clients and selecting the service from a list of available services. Referring to FIG. 2, the routine is entered at step 202. At step 204, the program queues the service for execution. At step 208, the program determines what the consequences of the requested user action are and whether they are destructive or non-destructive. At step 210, the consequences of the user action are tested. If the consequences are benign, then at step 212, the user action is immediately executed. Examples of situations where the consequences are benign are where no information will be lost or where any information that will be lost is backed up (this may be checked using an archive bit typically associated with each individual file). At step 220, the routine is exited.

If the consequences are not benign, then, at step 206, a delay period is initialized. At step 214, a check is made to determine if the user has indicated that the action should be cancelled. If the user has indicated that the action should be cancelled, then at step 216, the user action is cancelled.

Following cancellation, at step 220, the routine is exited. If the user, however, has not indicated that the action should be cancelled, then at step 218, a check is made to determine if the "cooling-off period" has expired. If the cooling-off period has not expired, then processing returns to step 214. However, if the cooling off period has expired, then at step 212, the user action is immediately executed. At step 220, the routine is exited.

At step 208, various criteria may be tested to determine whether or not the consequences of the requested user action are destructive or non-destructive. The criteria may be simply whether or not information is to be deleted, or it may be whether or not the data is backed up. In another advantageous embodiment; it may be a check on where the data is stored. For example, data on a server is usually backed up, whereas data on a client is frequently not backed up. In this situation, deletion of files on a server may be regarded as non-destructive, whereas deletion of files on a client may be regarded as destructive. Alternatively, where a vast majority of user data in a system is stored on a server such that a client contains only data of minor importance, deletion of files on a server may be regarded as destructive, whereas deletion of files on a client may be regarded as non-destructive. A further variation involves checking the type of computer on which the data is stored. A portable computer is perhaps less likely to have an up to date backup of data that is stored on it and detection of data may be more destructive than the same operation on a desktop computer.

The delay period set at step 206 may be varied according to the relative consequences of the user action. For example, a deletion of larger amounts of data may have a longer cooling-off period than a deletion of smaller amounts of data. In another variation, the cooling off period may be longer for a portable machine because of the lower likelihood of an up to date backup having been taken.

For a destructive service, the additional time taken to perform the service is not significant as the service itself may take several hours. To the end user, the syntax of the interaction is identical for all services and there is no redundant confirmation step required.

Furthermore, in another advantageous embodiment, the system provides a visual status indication that some destructive operation is waiting in the 'cooling-off' state, so that the user is aware of the state. This indication may be presented in a separate status area of the user screen so that it is not distracting to the user in the normal case where a destructive operation is required, while being noticeable of the operation was a mistake.

In a variation of the preferred embodiment, the cooling-off period technique is combined with the 'recycle bin' technique so that the data is hidden immediately, then automatically destroyed after the cooling-off period. This can be used with, for example, a conventional file delete operation.

What is claimed is:

1. A method of performing a destructive operation on a file, the method comprising:

responsive to a request to perform a destructive operation on a file, determining a consequence of the destructive operation;

responsive to the destructive operation being benign, immediately completing the destructive operation; and responsive to the destructive operation not being benign waiting a specified delay period before completing the destructive operation.

2. The method as recited in claim 1 further comprising:
canceling the destructive operation during the delay period.

3. The method as recited in claim 1 further comprising:
presenting a user with an indication that the destructive operation is in a delayed state.

4. The method as recited in claim 1 wherein the delay period is set to a pre-determined value by a user.

5. The method as recited in claim 1 wherein a length of the delay period is increased if the destructive operation is performed on a file that is stored on a serve where critical changes to the file are performed.

6. The method as recited in claim 1 wherein the destructive operation is benign if a backup copy of the file exists.

7. A computer system comprising:
means for receiving a request to perform a destructive operation on a file;
means for determining a consequence of the destructive operation;
means responsive to the destructive operation being benign, for immediately completing the destructive operation; and
means, responsive to the destructive operation not being benign, for waiting a specified delay period before completing the destructive operation.

8. The computer system as recited in claim 7 further comprising:
means for canceling the destructive operation during the delay period.

9. The computer system as recited in claim 7 further comprising means for presenting a user with an indication that the destructive operation is in a delayed state.

10. The computer system as recited in claim 7 wherein the delay period is set to pre-determined value by the a user.

11. The computer system as recited in claim 7 wherein a length of the delay period is increased if the destructive operation is performed on a file that is stored on a server where critical changes to the file are performed.

12. The computer system as recited in claim 7 wherein the destructive operation is benign if a backup copy of the file exists.

13. A computer program product including a computer-readable medium having stored thereon computer executable instructions for implementing a method of performing a destructive operation on a file, the computer executable instructions, when executed, performing the steps of:
responsive to a request to perform a destructive operation on a file, determining a consequence of the destructive operation;
responsive to the destructive operation being benign, immediately completing the destructive operation; and
responsive to the destructive operation not being benign, waiting a specified delay period before completing the destructive operation.

14. The computer program product as recited in claim 13 wherein the computer executable instructions further comprise the step of canceling the destructive operation during the delay period.

15. The computer program product as recited in claim 13 wherein the computer executable instructions further comprise the step of presenting a user with an indication that the destructive operation is in a delayed state.

16. The computer program product as recited in claim 13 wherein the delay period is set to a pre-determined value by a user.

17. The computer program product as recited in claim 13 wherein a length of the delay period is increased if the destructive operation is performed on a file that is stored on a server where critical changes to the file are performed.

18. The computer program product as recited in claim 13 wherein the destructive operation is benign if a backup copy of the file exists.

19. The method as recited in claim 1, wherein the destructive operation is assumed to be benign if the file is stored on a client computer serviced by a server on a network.

20. The method as recited in claim 1, wherein the destructive operation is assumed to be benign if the file is stored on a server that services a client computer on a network.

21. The method as recited in claim 1, wherein the destructive operation is assumed to be non-benign if the file is stored on a laptop computer.

22. The method as recited in claim 1, wherein the destructive operation is a deletion of the file.

23. The system as recited in claim 7, wherein the destructive operation is assumed to be benign if the file is stored on a client computer serviced by a server on a network.

24. The system as recited in claim 7, wherein the destructive operation is assumed to be benign if the file is stored on a server that services a client computer on a network.

25. The system as recited in claim 7, wherein the destructive operation is assumed to be non-benign if the file is stored on a laptop computer.

26. The system as recited in claim 7, wherein the destructive operation is a deletion of the file.

27. The computer program product as recited in claim 13, wherein the destructive operation is assumed to be benign if the file is stored on a client computer serviced by a server on a network.

28. The computer program product as recited in claim 13, wherein the destructive operation is assumed to be benign if the file is stored on a server that services a client computer on a network.

29. The computer program product as recited in claim 13, wherein the destructive operation is assumed to be non-benign if the file is stored on a laptop computer.

30. The computer program product as recited in claim 13, wherein the destructive operation is a deletion of the file.

* * * * *

UNITED STATES PATENT AND TRADEMARK OFFICE
CERTIFICATE OF CORRECTION

PATENT NO. : 6,912,662 B1 Page 1 of 1
DATED : June 28, 2005
INVENTOR(S) : McCall et al.

It is certified that error appears in the above-identified patent and that said Letters Patent is hereby corrected as shown below:

Column 5,
Line 11, delete "serve" and insert -- server --.

Signed and Sealed this

Fourth Day of April, 2006

JON W. DUDAS
*Director of the United States Patent and Trademark Office*